United States Patent Office 3,377,298
Patented Apr. 9, 1968

3,377,298
EMULSION PASTES OF PALE HYDROCARBON BINDING AGENTS
Jean Conort, Clermont-Ferrand, France, assignor to Esso Standard Société Anonyme Francaise, Paris, France, a corporation of France
No Drawing. Filed Mar. 4, 1964, Ser. No. 349,493
Claims priority, application France, Mar. 8, 1963, 927,350
18 Claims. (Cl. 260—8)

ABSTRACT OF THE DISCLOSURE

Emulsion pastes or emulsion viscous liquids for use as adhesives or coating compositions are prepared by admixing an aqueous gel of a swelling earth, from 0.5 to 15.0 wt. percent of an ionic emulsifier and from 40–60 wt. percent of a petroleum resin, based on the total emulsion, with or without additional water, pigments, and the like also being present. The emulsions are capable of being diluted with water, without breaking, to the extent that they can be sprayed onto surfaces or the pastes can be spread on surfaces such as pavements, walkways, etc., using mineral fillers, if desired.

---

The present invention relates to emulsion pastes of pale hydrocarbon binding agents, and is particularly concerned with emulsion pastes of pale hydrocarbon binding agents comprising petroleum resins, fluxed if necessary with an oil.

Petroleum resins are defined herein as the thermoplastic resins obtained by polymerization, in the presence of a catalyst of the Friedel-Crafts type, of steam cracked petroleum distillates, boiling in the range between about 30 and 280° C., or any fraction of these distillates boiling within the said range, or of mixtures of olefins and diolefins containing sufficient diolefins to obtain a resin and not an oil or a rubbery material. This polymerization is performed at temperatures which range generally from 0 to 70° C., and for preference from 10 to 55° C.

These resins are polydienic in character and have a ring and ball softening point between about 38 and 180° C. and they are generally light-colored.

Owing to their hardness, these resins are generally fluxed with oils (such as distillates extracted by means of a selective solvent) in proportions ranging for preference from 5 to 60% and better still from 20 to 40% of oil in relation to the mixture of resin and oil. Instead of adding the oil to the resin, it may be added during the manufacture of the resin to the polymerizate obtained during the polymerization of the steam cracked petroleum distillates; the usual distillation is then carried out, which makes it possible to obtain a mixture of resin and oil having the desired penetration.

These pale hydrocarbon binding agents may also contain for preference from 0.5 to 10% approximately of an essentially carbon-based natural or synthetic elastomer, such as the polymers and copolymers of olefins and diolefins (for instance the rubber known as "Butyl" which is a copolymer of isoprene and isobutylene, or a polybutadiene, polyisobutylene or a copolymer of butadiene and styrene or acrylo-nitrile) or of a polyolefin such as the polyethylenes and polypropylenes.

It is of interest in certain applications to have these pale binding agents in the form of emulsion pastes; this is particularly so for making water tight coating layers for terraces or vertical surfaces, floor coverings by coating sand in the cold state, insulating bottom layers, or for glueing panels (cork for instance) to vertical surfaces.

Pigmentation of these emulsion pastes moreover enables their applications to be extended to the painting of surfaces (vertical or otherwise) made, for example, of wood, metal or cement, for making roadways etc. These emulsion pastes can moreover be stored for a long time without deterioration.

The present invention consists of an emulsion paste which comprises an aqueous gel of a swelling earth, an ionic emulsifier and a pale hydrocarbon binding agent emulsified therein.

According to the invention, it is possible to use a swelling earth or a mixture of any swelling earths that is able to furnish a gel in the presence of water. Examples of suitable swelling earths include: natural colloidal clays such as the montmorillonites (including bentonites) and the attapulgites (including sepiolites), which are hydrated silicates of alumina or magnesia; organophilic colloidal clays derived from natural clays by the exchange of ions with organic bases; and clays which have an index of plasticity above 25. The natural colloidal clays are found on the market under the trademarks "Clarsol," "Bentonil," and "Argisil" bentonites. The organophilic colloidal clays are found on the market under the trademarks "Bentone," "Petro Bond," etc.

As examples of ionic emulsifiers that are suitable for the preparation of emulsion pastes according to the invention, mention may be made of cationic emulsifiers such as salts or mixtures of salts of:

(a) a water-soluble mineral or organic acid, such as hydrochloric acid, formic acid or acetic acid, and
(b) an organic phosphine or nitrogen base, such as:
   a primary, secondary or tertiary amine,
   a quaternary ammonium base,
   a primary, secondary or tertiary aliphatic polyamine,
   a polyamine to which there has been added alkylene oxide having for preference from 2 to 6 carbon atoms,
   an amido-amine,
   an amino-acid, and anionic emulsifiers, such as salts of an alkali metal and a fatty acid or a mixture of fatty acids or other acids, abietic acid, for instance. It is possible to mention in particular among the products that are suitable, the products of the saponification of:
   olein,
   "liquid resin" (residual vegetable oil),
   fish oils,
   palm oils,
   casein,
   colophony and an
   acid olive oil.

Since the emulsifiers for the emulsions in acid and basic phase are salts of phosphine, nitrogen bases or fatty acid salts, these salts are generally formed during the preparation of the emulsion by reaction between the phosphine or amine and an acid, such as HCl, $CH_3COOH$, or between the fatty acid and the alkaline base such as NaOH or KOH.

A convenient process for obtaining emulsion pastes according to the invention consists, for instance, of first preparing a gel of the swelling earth, and thereafter emulsifying the pale hydrocarbon binding agent in the gel.

The gel can be prepared by adding water to the swelling earth or by adding the earth to water in proportions ranging for preference from 10 to 40 kg. of the earth to about 100 litres of hot or cold water, i.e. from 10 to 40 parts by weight of the earth to about 100 parts by weight of water. The time taken to obtain the gel depends on the properties of the earth and the temperature of the water; it varies as a rule between 1 and 24 hours.

Then, the pale hydrocarbon binding agent can be emulsified in the gel as follows:

(a) the gel has incorporated with it, by mere mixing, (1) the cationic or anionic emulsifier in proportions ranging for preference from 0.5 to 15%, and better still from 1 to 6% in relation to the weight of the gel, and (2) water at a temperature ranging for preference from 0 to 80° C., in proportions preferably between 50 and 150% in relation to the weight of gel;

(b) the pale hydrocarbon binding agent is raised to a temperature such that its viscosity is for preference less than 200 degrees Engler, for instance, a temperature between 100 and 140° C.; and (c) the pale hydrocarbon binding agent is gradually added to the mixture of gel, water and emulsifier, in proportions such that the emulsion thus obtained contains for preference from 40 to 60% of pale hydrocarbon binding agent in relation to its total weight.

The operations of mixing and emulsification are conducted by dispersion means, such as mixers of the kneading trough and concrete mixer type, or rotary blade or screw mixers.

The order of the emulsification operations is not critical. The water, emulsifier and the pale hydrocarbon binding agent can be admitted in any order and/or in successive fractions.

According to a variant, the emulsion paste can also be obtained by mixing, in an apparatus such as a mixer, (A) the gel obtained by the introduction of water to the swelling earth plus the cationic or anionic emulsifier; and (B) an aqueous emulsion of the pale hydrocarbon binding agent obtained by dispersing the said binding agent in (1) an appropriate aqueous phase containing an acid or alkali, (2) in the presence of an organic nitrogen base or fatty acid which has been added to the aqueous phase or to the hydrocarbon binding agent.

The emulsion (B) above can be obtained by dispersing the pale hydrocarbon binding agent by the classic processes. For an acid emulsion, the pale hydrocarbon binding agent is dispersed in an aqueous phase which contains a mineral or organic acid, such as hydrochloric, acetic, and formic acid, in the presence of an organic nitrogen base which has been added to the acid aqueous phase or to the hydrocarbon binding agent. For a basic emulsion, the pale hydrocarbon agent is dispersed in an aqueous phase containing a fatty acid and an alkaline base.

There is thus obtained, according to the emulsifier used, an emulsion paste in acid or alkaline phase. This oily emulsion paste has a consistency that can vary from that of a lubricating oil to that of a thick grease, according to the quantity and the quality of the swelling earth used. It is easily spread with a spatula or putty knife.

This emulsion is stable; it is miscible with water and/or with an emulsion in the aqueous phase of the same nature as the pale hydrocarbon binding agent.

If it is diluted in water in the proportion, for instance, of 50 litres of water or more to 100 kg. of emulsion paste, the emulsion according to the invention can be applied with a brush, spray gun or roller.

The emulsion paste may, owing to its consistency, be spread on a vertical surface, for it does not run and, after drying, provides a light-colored coating which adheres without creep.

The acid emulsion pastes possess excellent adhesivity to materials such as concrete, cement, calcareous or siliceous granulates, plaster, bricks, wood, metals, board, and cellulose materials.

The acid or alkaline emulsion pastes of pale hydrocarbon binding agents according to the invention can easily be pigmented by the addition of mineral and/or organic pigments. Inert fillers may also be added.

Coloration of the emulsion pastes can be obtained by adding:

mineral pigments such as: titanium white, chrome yellow, cadmium red, iron oxides and chrome green; and organic pigments such as phthalocyanine blue or green, hansa yellow and toluidine red.

It is also feasible to use a mixture of mineral and organic pigments such as titanium white and pergantine yellow.

The emulsion pastes, whether or not pigmented, can be filled by adding mineral fillers such as: (1) finely divided powders (particles less than 80 microns, and for preference less than 5 microns), as for instance, sulphate of baryta, and slate dust, gypsum, kaolin, quartz or glass powders; (2) fibrous fillers, as for instance, asbestos fibre, glass wool or rock wool.

This addition of fillers or pigments can be performed by the following processes:

(1) Addition of dry pigment to the emulsion paste.—The emulsion paste is placed in a classic dispersion apparatus, such as the vertical mixer, and thereafter the pigment, proportioned to the desired weight, is poured slowly into the emulsion with mixing and stirring.

(2) Addition of pigment plus water.—In this case there is first prepared, with vigorous mixing a paste consisting of water and pigment, as for instance, of 50% water and 50% pigment. This paste can be added to the emulsion as in the previous case, but it is generally preferred to add the emulsion to the pigment and water, with mixing. The quantity of pigment added depends on the proportion of pale hydrocarbon binding agent in the emulsion.

There are generally added from 5 to 100 parts by weight of colored pigment to 100 parts of pale hydrocarbon binding agent, and for preference from 15 to 50 parts by weight of pigment to 100 parts by weight of binding agent. The percentage of pigment also of course depends on:

the coloring power of the pigment,
the covering power of the pigment and
the desired coloration.

Certain fillers and pigments in time diminish the stability of the emulsion paste or even cause it to break rapidly. In this case, the pigment is stabilized by an emulsifier which is compatible with the emulsion before being added to the emulsion.

In the case of acid emulsions, the filler or pigment is coated with a cationic emulsifier, e.g. a salt of a mineral or organic acid that is soluble in water (such as hydrochloric acid or acetic acid) and an organic nitrogen base (such as a primary, secondary or tertiary aliphatic amine or polyamine).

In the case of alkaline emulsions, the filer or pigment is coated with an anionic emulsifier, e.g. as obtained by the saponification of a fatty acid, mixed or not mixed with other acids, such as abietic acid, by means of a base (soda or potash).

The quantity of emulsifier is generally between 5 and 30% in relation to the filler or pigment, and the filler or pigment and the emulsifier (which may be diluted in, for preference, 2 to 20 times their weight of water) are mixed by means of classic dispersion apparatus.

The emulsion pastes according to the invention may also be prepared by:

either coloring the gel before the emulsification of the hydrocarbon binding agent, i.e., the swelling earth gel is first prepared, and then to this gel is added, with mixing, the pigment, water and anionic or cationic emulsifier and the pale hydrocarbon binding agent, or by coloring the pale hydrocarbon binding agent with a mixture of pigment and pale hydrocarbon binding agent at a temperature ranging from 100 to 140° C. before it is emulsified.

The following examples, which are given by way of explanation and not restrictively, will better show the scope and importance of the invention.

Example I

An acid paste emulsion was prepared from a hydrocarbon binding agent which had the following characteristics:

| | |
|---|---|
| Ball-ring softening point _____°C__ | 38 |
| ASTM penetration 25° C./100 g./5 sec. _____ | 205 |
| Gardner color (50% toluene solution) _____ | 10 |
| Flash point (Cleveland flash) _____°C__ | 284 |

This binding agent was obtained by mixing, during the manufacture of the resin, 65% by weight of polymerizate obtained during the polymerization of the steam-cracked petroleum distillates, and 35% by weight of a bright stock solvent oil. This mixture was then distilled, which made it possible to obtain a hydrocarbon binding agent consisting of a mixture of resin and oil.

The emulsion paste was prepared under the following conditions:

A bentonite gel was prepared by mixing for one minute, 270 g. of bentonite "Clarsol FB 2" with 730 g. of water at 60° C., and then the earth was allowed to swell, without mixing, for one hour. 200 g. of this gel were placed in a vertical mixer. To it were added 30 g. of an amine hydrochloride, obtained by causing a reaction between 10% 3-octadecyl-amino- propyl amine and 30% hydrochloric acid of 22° Bé. in solution in 60% water, and thereafter 270 g. of additional water were added to the vertical mixer.

After mixing, there were gradually admitted 500 g. of pale hydrocarbon binding agent at 120° C. This addition was made in 5 minutes, while continuing to mix.

There were thus obtained 1000 g. of an emulsion containing 50% pale hydrocarbon binding agent, which emulsion had the consistency of a thick grease and was miscible with water in all proportions.

Example II

An acid emulsion paste was prepared under the following conditions:

An emulsion in the acid aqueous phase (65%) was prepared by dispersing with a centrifugal pump, the same pale-colored hydrocarbon binding agent as in Example I. Formula of the emulsion:

| | Parts by weight |
|---|---|
| Pale hydrocarbon binding agent at 120° C. _____ | 650 |
| Water _____ | 350 |
| 3-octadecylamino-propylamine _____ | 10 |
| Hydrochloric acid 22° Bé. _____ | 15 |

There were placed in a mixer 500 g. of gel prepared as stated in Example I and 30 g. of the same amine hydrochloride were added. There were next poured in by small quantities in 10 minutes 1800 grams of the 65% emulsion prepared as above, while continuing to mix. There were thus obtained 2330 grams of an acid emulsion paste with 49% pale hydrocarbon binding agent, which emulsion had the consistency of a thick grease.

The emulsions of Examples I and II were spread with a spatula in a thick layer (0.5 cm.) on a vertical wall coated with cement mortar. It was possible to note that they adhered prefectly and did not flow after being exposed to the sun for several hours (55° C.).

These emulsions were also used for counter-glueing boards. On a square metre of board there were applied with a brush 50 g. of the emulsion prepared in Example I diluted in 50 g. water; another board glued to the first one adhered perfectly three months after glueing.

Example III

An alkaline emulsion paste was prepared under the following conditions:

A bentonite gel was prepared by mixing for one minute 160 grams of "Bentonil C" with 840 grams of water at 60° C., and then the earth was allowed to swell, without mixing, for one hour.

300 g. of this gel were placed in a vertical mixer and 191 g. water, 3 g. of soda and 6 g. of "liquid resin" were added.

After mixing, there were gradually added 500 g. of the same pale hydrocarbon binding agent as in Example I. The addition of this binding agent, heated to 120° C., was performed in 5 minutes while continuing to mix.

There were thus obtained 1000 grams of an emulsion containing 50% pale hydrocarbon binding agent, which emulsion had the consistency of a thick grease.

It was possible to observe that this emulsion paste spread in a thick layer on a vertical wall did not flow and adhered without creep.

Example IV

A red acid paste emulsion was prepared under the following conditions:

To 1 kg. of the acid emulsion paste obtained in Example I there were added:

| | |
|---|---|
| Natural iron oxide to be found in the trade under the name of Balaruc red, reference 600 __grams__ | 150 |
| and Water _____g__ | 100 |

After mixing in a vertical mixer, there were obtained 1250 grams of a red emulsion paste having the consistency of a thick grease.

The emulsion was diluted with 400 g. of water, the fluid emulsion thus obtained was mixed with 7 kg. sand 0/3 from Perrieres (quartzite sandstone with very high proportion of silica). Coating of the sand was found to be easy and homogeneous.

The coated material was spread on a highway to a thickness of 1 cm. and then rammed. After drying, a smooth, resistant and colored surface was obtained. (Applications: terraces, garden walks, slab joints etc.)

Example V

A white acid emulsion paste was prepared under the following conditions:

To 1 kg. emulsion paste obtained in Example II, there were added:

| | Grams |
|---|---|
| Titanium oxide (rutile) _____ | 250 |
| and Water _____ | 150 |

There was thus obtained a white emulsion paste having the consistency of a grease; this emulsion was spread by a spatula on the metal bonnet of a motor vehicle, to eliminate vibrations. After six months use, this white coating, matched to the color of the vehicle, remained stable in spite of the heat given off by the engine. After application of the coating, the metal sheet no longer vibrated.

Example VI

A yellow acid emulsion paste was prepared under the following conditions:

To 1 kg. acid emulsion paste obtained as in Example I, there were added:

| | Grams |
|---|---|
| Chrome yellow No. 3 _____ | 200 |
| and Water _____ | 100 |

A yellow emulsion paste was obtained having the consistency of a grease.

Using a putty knife, building agglomerates were coated with this paste. After drying for a few hours, the agglomerates, which were originally porous, became watertight (applications: waterproofing of walls, terraces, etc., with an emulsion paste of the color required).

This emulsion was also diluted in the proportion of 500 grams emulsion paste of yellow color and 500 g. of water. 1 kg. of fluid yellow emulsion was thus obtained.

This emulsion was applied to the roadway with a roller, and a marking strip of a yellow color was obtained which adhered perfectly to the roadway even in proportions of 500 grams dilute emulsion per square metre.

Example VII

A green alkaline emulsion paste was prepared under the following conditions:

To 1 kg. alkaline emulsion paste obtained in Example III there were added:

| | G. |
|---|---|
| Titanium oxide (anatase) | 100 |
| Phthalocyanine green | 20 |
| and | |
| Anionic soap formed from 75% "liquid resin" and 25% soda | 10 |

There wer thus obtained 1.130 kg. of a very stable, green alkaline emulsion paste. To this emulsion were added 500 g. of water and 5 kg. of fine sand (grain size between 0.1 and 0.3 mm.).

The coated sand thus obtained was stored away from air and was spread a month after manufacture on an asphalt pavement. A very compact green coating was obtained (application: manufacture of fine, storable colored coated materials).

Example VIII

A yellow acid emulsion paste was prepared under the following conditions:

A swelling earth gel was prepared consisting of:

| | G. |
|---|---|
| Bentonite "Clarsol FB 5" | 50 |
| and | |
| Water | 150 |

After the swelling of the gel, there were added to it:

150 grams of natural yellow iron oxide,
350 grams of water and
50 grams of an amine hydrochloride obtained by a reaction between 15% 3-octadecylamino- propylamine, 7% hydrochloric acid (22° Bé.) in solution in 78% water.

After mixing, there were gradually admitted 500 g. of pale hydrocarbon binding agent at 120° C. consisting of:

400 g. of a petroleum resin which had a Gardner color of 10, a molecular weight of 1000 and a ball-ring softening point of 100° C. and
100 g. of a spindle oil which had a viscosity at 50° C. of 1.4° Engler.

There were thus prepared 1250 g. of a yellow emulsion paste.

This emulsion was diluted in 1000 grams of water. There were obtained 2250 g. of a yellow fluid emulsion. This emulsion was applied with a spray gun to:

cement edges,
a wall coated with plaster,
woodwork and glass and
a metal garden table The yellow paint adhered perfectly to all these surfaces.

In fine weather, the breaking of the emulsion occurred about 30 minutes after spreading; it was then possible to sprinkle the painted surface with water without damage.

What is claimed is:

1. An emulsion paste which comprises, in combination, (1) an aqueous gel of a swelling earth, (2) between about 0.5 and about 15 wt. percent, based on said aqueous gel, of an emulsifier selected from the group consisting of cationic and anionic emulsifiers, and (3) between about 40 and about 60 wt. percent, based on the total weight of the emulsion, of a petroleum resin prepared by the polymerization of a steam cracked petroleum distillate boiling in the range of between 30° C. and 280° C. with a Friedel-Crafts catalyst and at a temperature of between about 0° C. and about 70° C..

2. The emulsion paste of claim 1 wherein the swelling earth is selected from the group consisting of natural colloidal clays, organophilic modified clays and clays having a plasticity index above 25.

3. The emulsion paste of claim 1 wherein the swelling earth is a bentonite clay.

4. The emulsion paste of claim 1 wherein the petroleum resin is fluxed with between about 5 and about 60 wt. percent of a hydrocarbon oil.

5. The emulsion paste of claim 1 wherein the aqueous gel of a swelling earth comprises between about 10 and about 40 parts by weight of earth per 100 parts by weight of water.

6. The emulsion paste of claim 1 wherein between about 1 and about 6 wt. percent of emulsifier is employed.

7. An emulsion paste which comprises, in combination, (1) an aqueous gel of a swelling earth comprising between about 10 and about 40 parts by weight of earth per 100 parts by weight of water, (2) between about 0.5 and about 15 wt. percent, based on said aqueous gel, of an emulsifier selected from the group consisting of cationic and anionic emulsifiers, (3) between about 50 and about 150 wt. percent, based on said aqueous gel, of additional water, and (4) between about 40 and about 60 wt. percent, based on the total weight of emulsion, of a petroleum resin prepared by the polymerization of a steam cracked petroleum distillate boiling in the range of between 30° C. and 280° C. with a Friedel-Crafts catalyst and at a temperature of between about 0° C. and about 70° C.

8. An acid emulsion paste comprising, in combination, (1) an aqueous gel of a bentonite clay, the weight ratio of clay to water being between about 0.1:1 and about 0.4:1, (2) between about 0.5 and about 15 wt. percent, based on said aqueous gel, of a cationic emulsifier, (3) between about 50 and about 150 wt. percent, based on said aqueous gel, of additional water, and (4) between about 40 and about 60 wt. percent, based on the total weight of emulsion, of a petroleum resin prepared by the polymerization of a steam cracked petroleum distillate boiling in the range of between about 30° C. and about 280° C. with a Friedel-Crafts catalyst and at a temperature of between about 0° C. and about 70° C.

9. An alkaline emulsion paste comprising, in combination, (1) an aquous gel of a bentonite clay, the weight ratio of clay to water being between about 0.1:1 and about 0.4:1, (2) between about 0.5 and about 15 wt. percent, based on said aqueous gel, of an anionic emulsifier, (3) between about 50 and about 150 wt. percent, based on said aqueous gel, of additional water, plus a minor amount of soda and (4) between about 40 and about 60 wt. percent, based on the total weight of emulsion, of a petroleum resin prepared by the polymerization of a steam cracked petroleum distillate boiling in the range of between 30° C. and about 280° C. with a Friedel-Crafts catalyst and at a temperature of between about 0° C. and about 70° C.

10. A process for preparing an emulsion paste which comprises admixing (1) an aqueous gel of a swelling earth, (2) between about 0.5 and about 15 wt. percent, based on said aqueous gel, of an emulsifier selected from the group consisting of cationic and anionic emulsifiers, and (3) between about 40 and about 60 wt. percent, based on the total weight of the emulsion, of a petroleum resin prepared by the polymerization of a steam cracked petroleum distillate boiling in the range of between 30° C. and 280° C. with a Friedel-Crafts catalyst and at a temperature of between about 0° C. and about 70° C.

11. The process of claim 10 wherein the swelling earth is selected from the group consisting of natural colloidal clays, organophilic modified clays and clays having a plasticity index above 25.

12. The process of claim 10 wherein the swelling earth is a bentonite clay.

13. The process of claim 10 wherein the petroleum resin is fluxed with between about 5 and 60 wt. percent of a hydrocarbon oil.

14. A process for preparing an emulsion paste which comprises admixing (1) an aqueous gel of a swelling earth comprising from between about 10 and about 40 parts by weight of earth per 100 parts by weight of water, (2) between about 0.5 and about 15 wt. percent, based on said aqueous gel, of an emulsifier selected from the group consisting of cationic and anionic emulsifiers, (3) between about 50 and about 150 wt. percent, based on said aqueous gel, or additional water, and (4) between about 40 and about 60 wt. percent, based on the total weight of emulsion, of a petroleum resin prepared by the polymerization of a steam cracked petroleum distillate boiling in the range of between 30° C. and 280° C. with a Friedel-Crafts catalyst and at a temperature of between about 0° C. and about 70° C.

15. The process of claim 14 wherein the petroleum resin (4) is preheated to a temperature such that the viscosity of the resin is reduced to below 200 degrees Engler prior to its being gradually admixed with the aqueous gel (1), the emulsifier (2) and the water (3).

16. The process of claim 14 wherein the petroleum resin is preheated to a temperature of between about 100° C. and about 140° C.

17. A procss for preparing an emulsion paste of an aqueous gel of a swelling earth and a petroleum resin prepared by (a) polymerizing a steam cracked petroleum distillate boiling in the range of between about 30° C. and about 280° C. with a Friedel-Crafts catalyst at a temperature of between about 0° C. and about 70° C. and (b) fluxing said resin with between about 5 and about 60 wt. percent, of a hydrocarbon oil, which comprises (1) mixing a swelling earth with water in the ratio of between about 10 and about 40 parts by weight of swelling earth per 100 parts by weight of water, (2) allowing said earth to swell for a period of between about 1 and about 24 hours to form an aqueous gel, (3) mixing said aqueous gel with between about 1 and about 6 wt. percent, based on said gel, of an emulsifier selected from the group consisting of anionic and cationic emulsifiers, and with between about 50 and about 150 wt. percent, based on said gel, of additional water and (4) gradually mixing the product of (3) with between about 40 and about 60 wt. percent, based on the total emulsion paste, of said oil fluxed petroleum resin, said resin having been preheated to a temperature of between about 100° C. and about 140° C.

18. The process of claim 17 which comprises the further step of mixing with the final emulsion paste between about 50 and about 100 wt. percent, based on oil fluxed petroleum resin, of a material selected from the group consisting of mineral fillers, fibrous fillers, mineral pigments, organic pigments and combinations thereof.

References Cited

UNITED STATES PATENTS

| | | | |
|---|---|---|---|
| 2,401,666 | 6/1946 | Schmidt | 260—8 |
| 2,699,432 | 1/1955 | Marra et al. | 260—8 |
| 2,809,948 | 10/1957 | Hunter et al. | 260—29.7 |
| 2,834,744 | 5/1958 | Lander | 260—29.7 |

OTHER REFERENCES

Piccopale, Penn. Ind. Chem. Corp., August 1959, 260–82.

WILLIAM H. SHORT, *Primary Examiner.*

E. M. WOODBERRY, *Assistant Examiner.*